UNITED STATES PATENT OFFICE.

WILLIAM W. NEUER, OF WILKES-BARRÉ, PENNSYLVANIA.

COMPOSITION OF MATTER TO BE USED FOR PREVENTING DISCOLORATION OF BURNED BRICK, &c.

SPECIFICATION forming part of Letters Patent No. 350,550, dated October 12, 1886.

Application filed May 25, 1886. Serial No. 203,197. (No specimens.)

*To all whom it may concern:*

Be it known that I, WILLIAM W. NEUER, a citizen of the United States, residing at Wilkes-Barré, in the county of Luzerne and State of Pennsylvania, have invented a new and useful Composition of Matter to be Used for Preventing Discoloration of Burned Bricks, Terra-Cotta, and also Stone, and for Preserving Bricks, Terra-Cotta, Stone, and Wood, of which the following is a specification.

My composition consists of the following ingredients, combined in proportions stated: linseed-oil, thirteen per cent.; petroleum, refined, seventy-four per cent.; turpentine, eleven per cent.; creosote, four and a half per cent.; extracts of coal-tar, six per cent.; paraffine, four per cent.; beeswax, four and a half per cent., these ingredients to be thoroughly mixed together.

I am aware that vegetable oil, petroleum, beeswax, turpentine, resin, and muriatic acid have heretofore been used for preserving the color of brick, terra-cotta, &c., the same having been embodied in previous applications for Letters Patent made by me; but I do not include such ingredients, broadly, in the claims presented herein. In addition to the ingredients heretofore used by me I now employ creosote and the extracts of coal-tar, whereby the present composition serves not only as a color-preserving compound, but also as a cleansing composition, and consequently rendering said composition of general utility and sufficient for all of its purposes, aside from any preliminary applications to the materials to be treated of extraneous compounds or substances.

What I claim, and desire to secure by Letters Patent of the United States, is—

1. The herein-described composition of matter, to be used for preventing discoloration of bricks, terra-cotta, and stone, and for preserving bricks, terra-cotta, stone, and wood, consisting of linseed-oil, petroleum, refined, turpentine, creosote, extracts of coal-tar, paraffine, and beeswax.

2. The herein-described method of preventing discoloration of bricks, terra-cotta, and stone, and for preserving bricks, terra-cotta, stone, and wood, the same consisting in applying to the bricks, terra-cotta, stone, and wood linseed-oil, petroleum, refined, turpentine, creosote, extracts of coal-tar, paraffine, and beeswax, to protect the surface of the material, substantially as described.

3. The herein-described method of preventing discoloration of bricks, terra-cotta, and stone, the same consisting in applying to the bricks or other material a cleaning compound of muriatic acid and water, then applying a composition of linseed-oil, petroleum, refined, turpentine, creosote, extracts of coal-tar, paraffine, and beeswax, to protect the surface of the material, substantially as set forth.

WILLIAM W. NEUER.

Witnesses:
S. C. STRUTHERS,
STANLEY W. WALKER.